United States Patent [19]
Hutt

[11] Patent Number: 6,142,360
[45] Date of Patent: Nov. 7, 2000

[54] METHOD OF FRICTION WELDING TUBULAR MEMBERS

[75] Inventor: Graham Anthony Hutt, Banchory, United Kingdom

[73] Assignee: Fitzpatricks, Glasgow, United Kingdom

[21] Appl. No.: 09/142,686

[22] PCT Filed: Feb. 26, 1997

[86] PCT No.: PCT/GB97/00535

§ 371 Date: Sep. 9, 1998

§ 102(e) Date: Sep. 9, 1998

[87] PCT Pub. No.: WO97/32686

PCT Pub. Date: Sep. 12, 1997

[30] Foreign Application Priority Data

Mar. 9, 1996 [GB] United Kingdom .................... 9605054

[51] Int. Cl.[7] .............................. B23K 1/06; B23K 5/20; B23K 37/00; B23K 20/12; B23K 31/02
[52] U.S. Cl. .......................................... 228/114.5; 228/1.1
[58] Field of Search .............................. 228/114.5, 112.1, 228/1.1, 2.1, 2.3

[56] References Cited

U.S. PATENT DOCUMENTS

| | | | |
|---|---|---|---|
| 3,874,067 | 4/1975 | Toyooka et al. ........................ | 29/470.3 |
| 4,063,676 | 12/1977 | Lilly ........................................ | 228/114 |
| 4,331,280 | 5/1982 | Terabayashi et al. ................... | 228/112 |

*Primary Examiner*—Patrick Ryan
*Assistant Examiner*—Cecilia Newsome
*Attorney, Agent, or Firm*—Flehr Hohbach Test Albritton & Herbert LLP

[57] ABSTRACT

A method of welding two tubular members (1, 2) in end to end relationship includes providing the end of each tubular member (1, 2) to be joined with a shaped portion (3, 4). The shaped portion (3, 4) has a surface (10) which is substantially perpendicular to the radius of the tubular member (1, 2) and a second surface (13) at an obtuse angle to the radius of the tubular member (1, 2). Hence, when the ends to be joined are brought into contact with each other, shaped portions (3, 4) define a three-sided channel (13, 10, 13). A ring-shaped member (6) having a quadrilateral cross section is located in the channel. The ring-shaped member (6) has a radius which is greater than the radius of the first surface and less than the radius of the external wall of the tubular member (1, 2). The ring-shaped member (6) is rotated relative to the tubular members (1, 2) and the ring-shaped member (6) is subsequently compressed to bring the ring-shaped member (6) into contact with the shaped portions (3, 4) of the tubular members (1, 2) to form a friction weld which welds the tubular members (1, 2) together in end to end relationship.

21 Claims, 3 Drawing Sheets

METHOD OF FRICTION WELDING TUBULAR MEMBERS

The invention relates to a method of friction welding and in particular, a method of radial friction welding for welding two tubular members in end to end relationships.

Conventional methods of welding tubular members, such as lengths of pipe spool, together in end to end relationships have involved electric arc welding by a skilled operator. Such welding is time consuming as the weld is progressed circumferentially around the join in the tubular members. In addition, traditional welding techniques involve melting the metal of the tubulars which may not be suitable for bi-metallic tubulars and melting of the material can result in a number of metallurgical problems. In addition, it may be necessary to carry out the welding operation in an inert atmosphere to prevent or minimise oxidation of the metal of the tubular members.

Welding of tubular members in an end to end relationship has been suggested by radial friction welding. This method involves chamfering the ends of tubular members to be joined together so that when the A V-shaped ring is placed in the V-shaped recess and rotated at high-speed while being compressed to bring it into contact with the ends of the tubular members to form a friction weld to weld the tubular members together.

However, in practice it has been found that this method of friction welding of the tubulars has a tendency for the weld to be flawed as the weld tends to bridge above the junction of the tubulars and results in a defect in the weld on the internal surface of the tubular members. This is a particular problem where the tubular members are intended to convey fluids, for example the tubular members on part of a pipeline. Because of these problems, radial friction welding of pipes has not been pursued further.

In accordance with the present invention, a method of friction welding two tubular members in an end to end relationship comprises providing the end of each tubular member to be joined with a shaped portion, the shaped portion having a surface which is substantially perpendicular to the radius of the tubular member and a second surface at an obtuse angle to the radius of the tubular member, such that when the ends to be joined are brought into contact with each other, the shaped portions define a three sided channel; locating a ring shaped member having a quadrilateral cross-section in the channel, the ring shaped member having a radius which is greater than the radius of the first surface and less than the radius of the external wall of the tubular member, rotating the ring relative to the tubular members and subsequently compressing the ring, to bring the ring into contact with the shaped portions of the tubular members to form a friction weld which welds the tubular members in an end to end relationship.

In accordance with another aspect of the present invention, a ring shaped member for friction welding to tubular members in an end to end relationship, wherein the ring shaped member has a quadrilateral cross-section.

The invention has the advantage that by having a channel with a surface which is substantially perpendicular to the radius of two tubular members and to the compression force applied to the ring, it is possible to friction weld two tubular members in an end to end relationship and minimise the possibility of defects in the friction weld.

Preferably, the ring shaped member has a substantially trapezial cross-section and the trapezial cross-section of the ring shaped member is of a generally similar shape to the cross-sectional shape of the channel formed when the shaped ends of the tubular members are brought into end to end relationships.

Typically, the ring shaped member is of the same material as the tubular members to be welded in an end to end relationship. Preferably, the tubular members and the ring shaped member are formed from a metal. Typically, where the tubular members are bi-metallic, the ring shaped member may also be bi-metallic.

Preferably, a support member is inserted into the tubular members to support the ends of the tubular members during friction welding. Typically, the support member is expandable to contact the inside surfaces of the tubular members.

Examples of a method of radial friction welding in accordance with the invention will now be described with reference to the accompanying drawings, in which.

Figure 1:
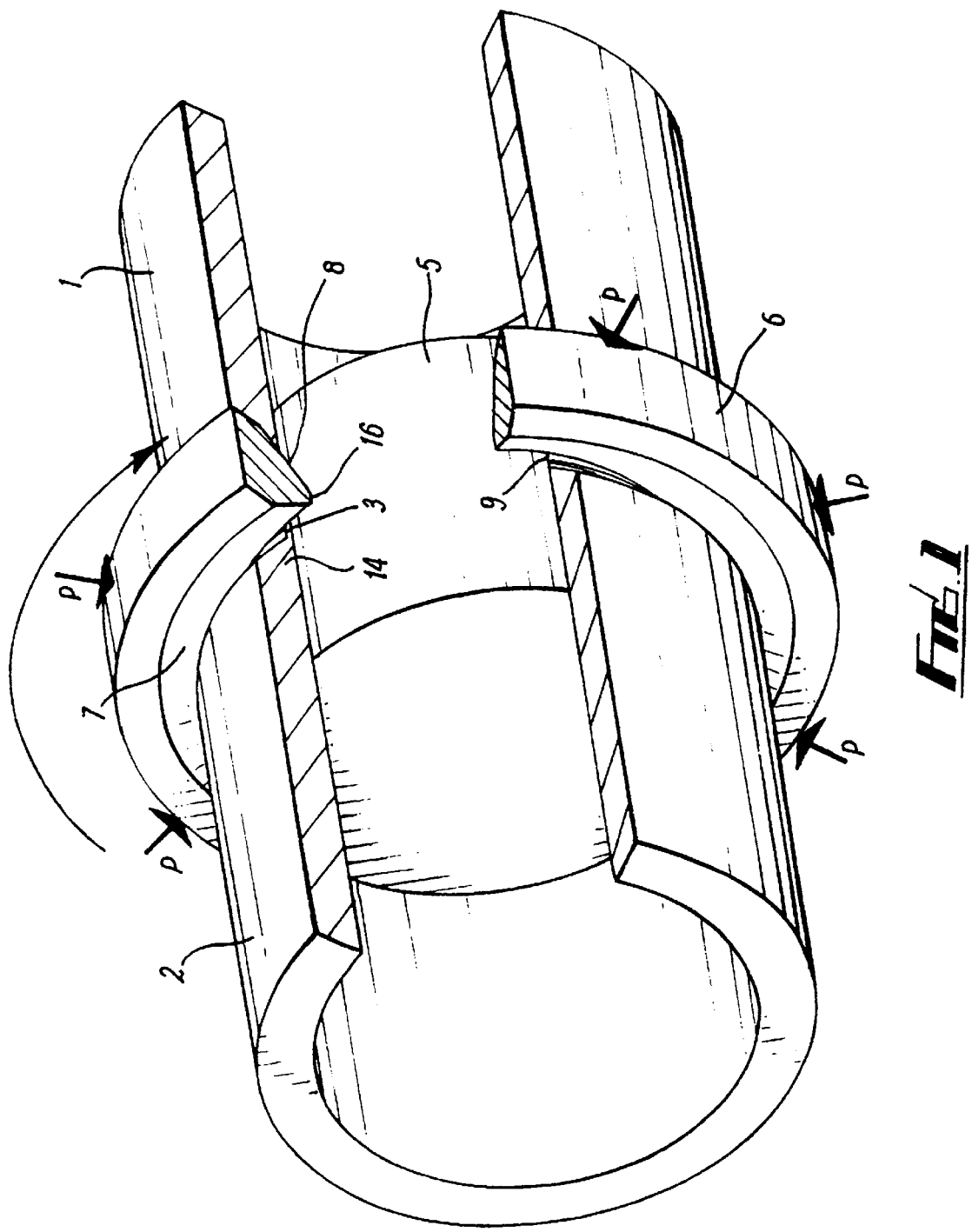
FIG. 1 is a partial cross-section perspective view showing two tubular members being friction welded.
Figure 2:
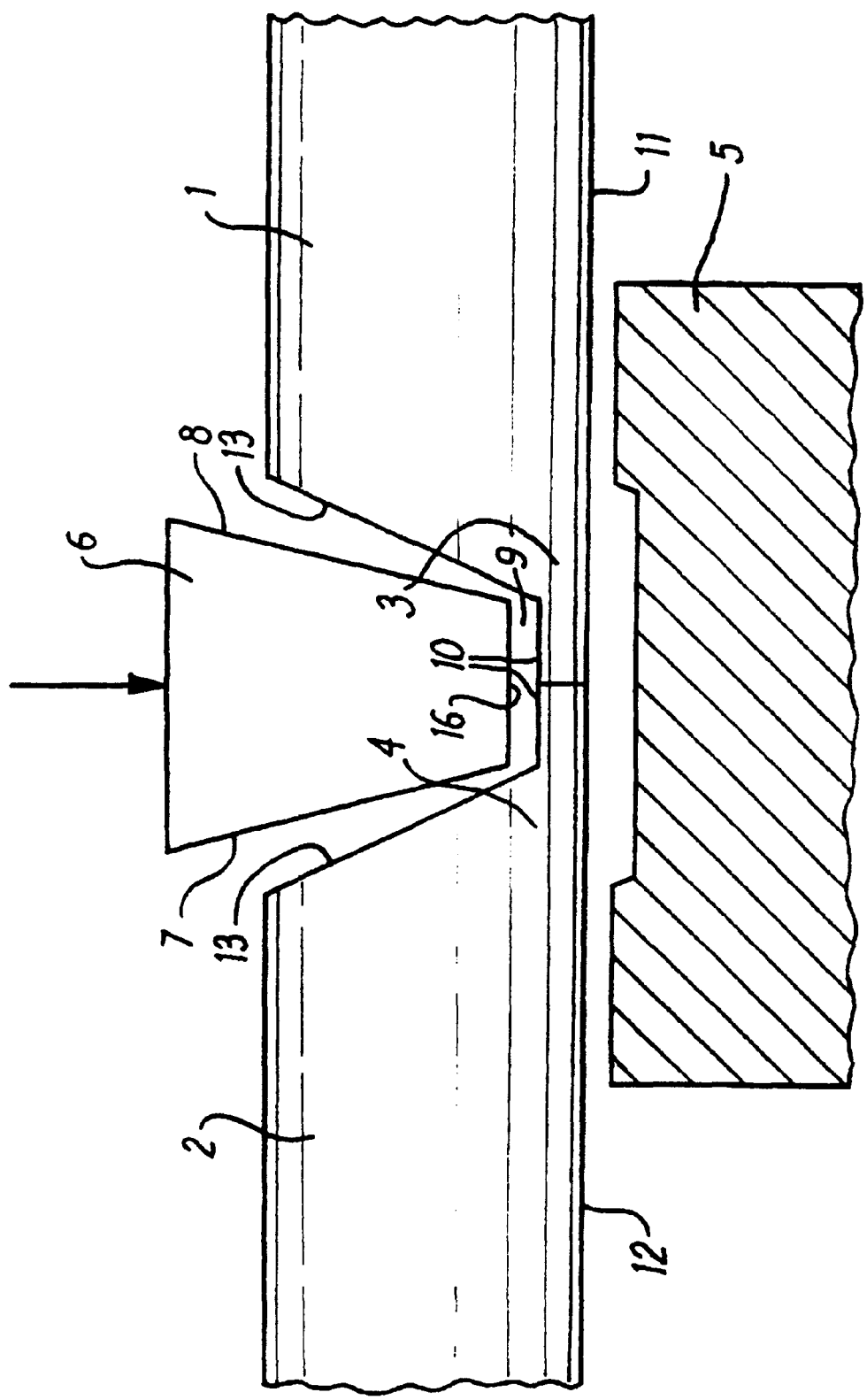
FIG. 2 is a cross-sectional view through the apparatus shown in FIG. 1 prior to welding.

FIG. 1 shows two pipes 1, 2 which have their ends 3, 4 abutted against each other. An internal expanding mandrel 5 is located within the pipes 1, 2 and is expanded until it butts against the inside surface of the pipes 1, 2 adjacent to the ends 3, 4. A ring 6 is located around the pipes 1, 2 and the internal portion of the ring has a bottom surface 16 and two side surfaces 7, 8 which locate in a channel 9 defined by shaped portions on the ends 3, 4 of the pipes 1, 2. The channel 9 is shown in more detail in FIG. 2 where it can be seen that each of the pipes 1, 2 have their respective ends 3, 4 provided with a shaped portion which comprises a surface 10 which is substantially parallel to the surface 16 on the ring and substantially parallel to inside surfaces 11, 12 of the pipes 1, 2. Extending from the surfaces 10 is an angled surface 13.

Figure 3:
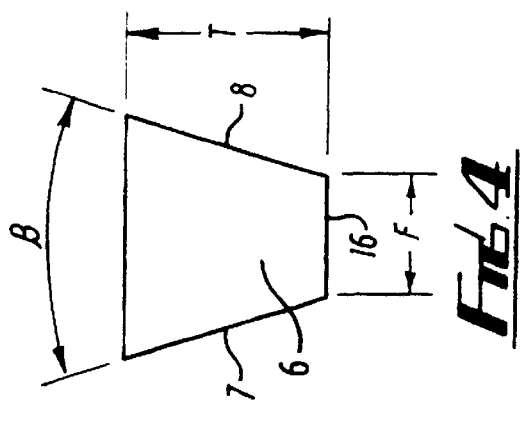
FIG. 3 is a cross-sectional view through the tubular members when in an end to end relationship before welding and with a ring and internal mandrel omitted.
Figure 4:
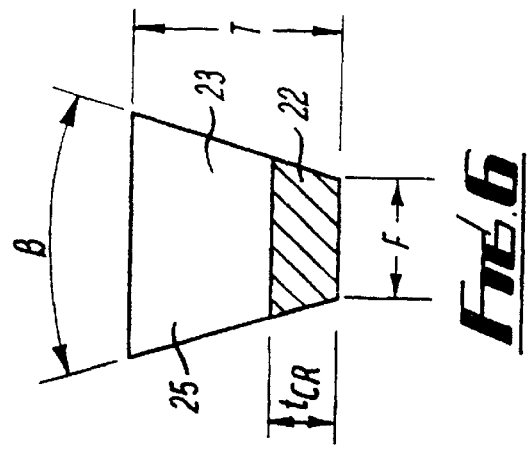
FIG. 4 is a cross-sectional view through a ring for use in the friction welding operation shown in FIG. 1.

As shown in FIG. 3, the angle alpha is the angle between the two surfaces 13 and the angle alpha is greater than the angle beta (see FIG. 4) which is the angle between the side surfaces 7, 8 on the ring 6. In a typical example, the angle alpha may be 50° and the angle beta may be 45°. The total length of the surfaces 10 when joined together is indicated by the dimension "L" on FIG. 3 and is approximately equal to the width of the surface 16, indicated by the letter "F" on FIG. 4. Typically, the dimensions L and F are approximately 4 mm. The depth of material between the surfaces 10 and inside surfaces 12, 11 is indicated by the letter "R" on FIG. 3 and may typically be approximately 2 mm. These dimensions and configurations are typical angles and dimensions for the pipes 1, 2 having a diameter of 169.3 mm and a wall thickness of 14.3 mm. The ring 6 may have a depth "T" (see FIG. 4) of an internal diameter of approximately 145 mm, an external diameter of approximately 194 mm and a thickness of approximately 24.4 mm.

In use, the ring 6 is rotated at high speed and then compressed into contact with surfaces 13, 10 of the channel 9 to cause heating of the material at the surfaces 7, 8, 16, 10, 13 by friction generated by the ring 6 contacting the surfaces 13, 10 as the ring 6 is rotated relative to the pipes 1, 2. After sufficient heat has been generated, the ring is compressed with a forging force to weld the ring to the pipes 1, 2 and weld the pipes 1, 2 in an end to end relationship.

Figure 5:
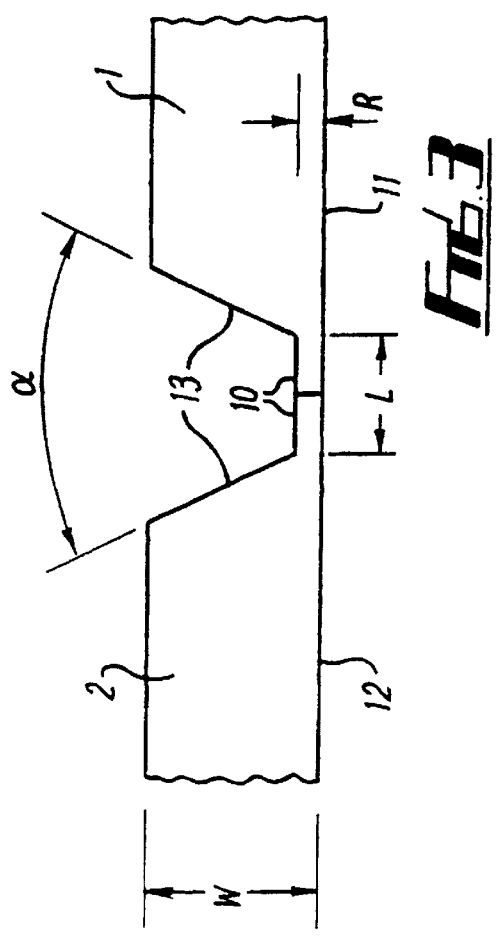
FIG. 5 is a cross-sectional view through two bi-metallic pipes in an end to end relationship before being friction welded; and, FIG. 6 is a cross-sectional view through a bi-metallic ring for use in friction welding bi-metallic pipes shown in FIG. 5.
Figure 6:
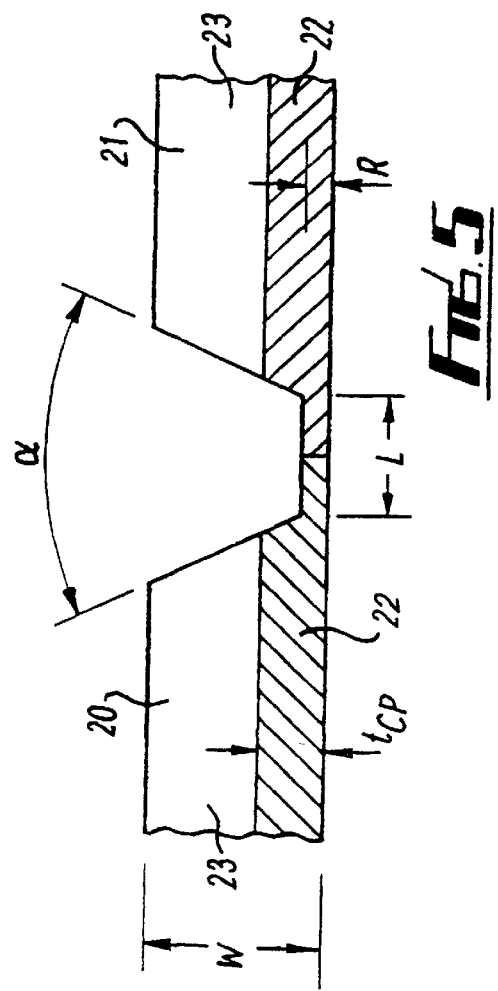

The invention can also be used for welding bi-metallic pipes, such as the pipes 20, 21 shown in FIGS. 5 and 6. Pipes 20, 21 comprise an internal metal layer of a first metal 22 and an external metal 23.

In this example a bi-metallic ring 25 is used which also comprises metal 22 on the internal surface and metal 23 on the external surface. Typically, the thickness $t_{cp}$ of the metal layer 22 on the pipes 20, 21 is less than the thickness $t_{cr}$ of the metal layer 22 on the ring 25. However, it is possible that the thicknesses may be the same or that the thickness $t_{cr}$ may be less than the thickness $t_{cp}$. The particular angles and dimensions for the pipes 20, 21 and the ring 25 are chosen so as to promote the best possible weld and are not necessarily the same as that described above for FIGS. 3 and 4.

In addition, it is possible that the angles and dimensions described above for FIGS. 3 and 4 could be different depending on the particular metal or alloy composition of the pipes 1, 2 and ring 6. The pipes 20, 21 and ring 25 are friction welded in the same manner as described above for the pipes 1, 2 and the ring 6 and the particular parameters of the friction weld in process will be chosen to suit the particular weld and the metals for alloys involved.

An advantage of the invention is that by using a three sided channel it is possible to use a friction welding method to join tubular members, such as pipes in an end to end relationship while minimising the risk of a defect in the weld zone. Modifications and improvements may be incorporated without departing from the scope of the invention.

What is claimed is:

1. A method of friction welding two tubular members in an end to end relationship comprising the steps of:
    providing the end of each tubular member to be joined with a shaped portion, the shaped portion having a first surface which is substantially perpendicular to the radius of the tubular member and a second surface at an obtuse angle to the radius of the tubular member, such that when the ends to be joined are brought into contact with each other, the shaped portions define a three sided channel;
    locating a ring shaped member in the channel, the ring shaped member having a radius which is greater than the radius of the first surface and less than radii of external walls of the tubular members, and at least an internal portion of the ring shaped member having a quadrilateral cross-section; and
    rotating the ring relative to the tubular members and subsequently compressing the ring, to bring the ring into contact with the shaped portions of the tubular members to form a friction weld which welds the tubular members together in end to end relationship.

2. A method according to claim 1, wherein the ring shaped member has a substantially trapezial cross-section.

3. A method according to claim 2, wherein the trapezial cross-section of the ring shaped member is similar in shape to the cross-sectional shape of the channel formed when the shaped ends of the tubular members are brought into end to end relationship.

4. A method according to claim 1, wherein the ring shaped member is of the same material as the tubular members to be welded together in end to end relationship.

5. A method according to claim 2, wherein the ring shaped member is of the same material as the tubular members to be welded together in end to end relationship.

6. A method according to claim 3, wherein the ring shaped member is of the same material as the tubular members to be welded together in end to end relationship.

7. A product according to claim 1, wherein where the tubular members are bimetallic and the ring shaped member is also bimetallic.

8. A product according to claim 2, wherein where the tubular members are bi-metallic and the ring shaped member is also bi-metallic.

9. A product according to claim 4, wherein where the tubular members are bi-metallic and the ring shaped member is also bi-metallic.

10. A method according to claim 1, further comprising the step of inserting a support member into the tubular members to support the ends of the tubular members during friction welding.

11. A method according to claim 2, further comprising the step of inserting a support member into the tubular members to support the ends of the tubular members during friction welding.

12. A method according to claim 4, further comprising the step of inserting a support member into the tubular members to support the ends of the tubular members during friction welding.

13. A method according to claim 8, further comprising the step of inserting a support member into the tubular members to support the ends of the tubular members during friction welding.

14. A method according to claim 10, wherein the support member is inserted into the tubular members and expanded to contact the inside surfaces of the tubular member.

15. A method according to claim 11, wherein the support member is inserted into the tubular members and expanded to contact the inside surfaces of the tubular member.

16. A method according to claim 12, wherein the support member is inserted into the tubular members and expanded to contact the inside surfaces of the tubular member.

17. A method according to claim 13, wherein the support member is inserted into the tubular members and expanded to contact the inside surfaces of the tubular member.

18. In combination a tubular member and a ring shaped member for friction welding two such tubular members in end to end relationship, said ends of said tubular members including a shaped portion having a first surface which is substantially perpendicular to a radius of the tubular member and a second surface at an obtuse angle to the radius of the tubular member, such that when the ends of said first tubular member and said second tubular member are brought into contact with each other, the shaped portions define a three sided channel, and wherein at least an inner portion of the ring shaped member has a quadrilateral cross-section.

19. A ring shaped member according to claim 18, wherein said inner portion of the ring shaped member has a trapezial cross-section.

20. A method according to claim 13, wherein the support member is inserted into the tubular members and expanded to contact the inside surfaces of the tubular member.

21. A tubular apparatus, comprising:
    first and second tubular members in an end to end relationship, said ends of said tubular members including a shaped portion having a first surface which is substantially perpendicular to a radius of the tubular member and a second surface at an obtuse angle to the radius of the tubular member, such that when the ends of said first tubular member and said second tubular member are brought into contact with each other, the shaped portions define a three sided channel; and
    a ring shaped member friction welded to said first tubular member and said second tubular member at said channel to weld said first tubular member to said second tubular member.

* * * * *

UNITED STATES PATENT AND TRADEMARK OFFICE
CERTIFICATE OF CORRECTION

PATENT NO.    : 6,142,360
DATED         : November 7, 2000
INVENTOR(S)   : Hutt

Page 1 of 1

It is certified that error appears in the above-identified patent and that said Letters Patent is hereby corrected as shown below:

<u>Title page,</u>
Item [73], Assignee, change "Fitzpatricks, Glasgow, United Kingdom" to -- Stolt Offshore Limited, Aberdeen, United Kingdom --.

Signed and Sealed this

Thirteenth Day of August, 2002

*Attest:*

*Attesting Officer*

JAMES E. ROGAN
*Director of the United States Patent and Trademark Office*